United States Patent [19]
Heinrich

[11] Patent Number: 5,456,209
[45] Date of Patent: Oct. 10, 1995

[54] PREFORMED HEATED FLOORING SYSTEM FOR STABLES AND OTHER ANIMAL SHELTERS

[76] Inventor: Michel Heinrich, 2 Marienstrasse, 56269 Marienhausen, Germany

[21] Appl. No.: 125,073

[22] Filed: Sep. 21, 1993

[30]    Foreign Application Priority Data

Sep. 21, 1992 [DE] Germany .................... 42 31 373.2
Aug. 4, 1993 [DE] Germany .................... 43 26 163.9
Aug. 23, 1993 [EP] European Pat. Off. ......... 93113403

[51] Int. Cl.⁶ ................................................ A01K 1/015
[52] U.S. Cl. ............................................................ 119/28
[58] Field of Search ............... 119/28, 28.5; 52/220.3, 52/405.2

[56]            References Cited

U.S. PATENT DOCUMENTS 3,809,014  5/1974  Jones et al. .................. 119/28
3,824,960  7/1974  Kaltenbock .................. 119/28
4,018,271  4/1977  Jones et al. .................. 119/28

FOREIGN PATENT DOCUMENTS 102599   2/1926   Austria .................... 119/28
472206   2/1992   European Pat. Off. ........ 119/28
346448   1/1905   France ..................... 119/28
3244732  6/1984   Germany .................... 119/28
3927462  12/1991  Germany .
8003066  1/1982   Netherlands ............... 119/28
1656097  6/1991   U.S.S.R. .................. 119/28

Primary Examiner—Todd E. Manahan
Attorney, Agent, or Firm—Kinney & Lange

[57]            ABSTRACT

The present invention is a preformed, shaped part that forms a surface for farm animals to stand on in stables. The preformed parts are made to interconnect into an intermediate floor for mounting on a grating. The preformed, shaped part, when assembled, creates a substantially hollow body in which a bottom plate covers the heating device to heat the tread surface, and also includes an insulation layer for downward heat insulation of the heating device.

17 Claims, 11 Drawing Sheets

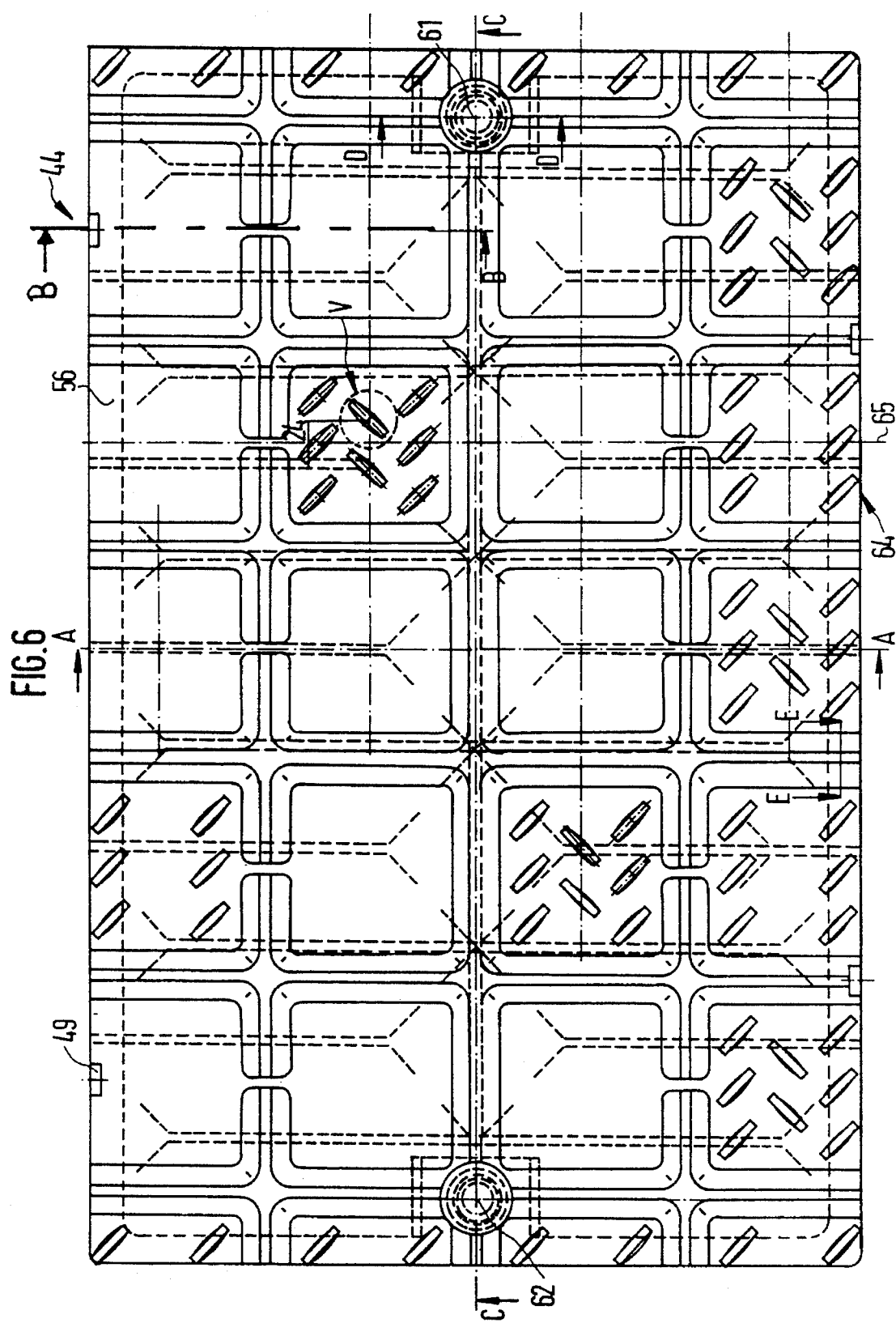

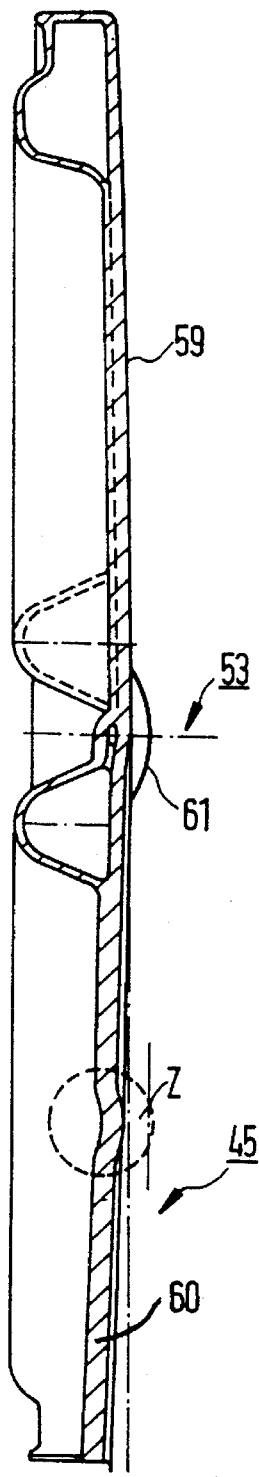
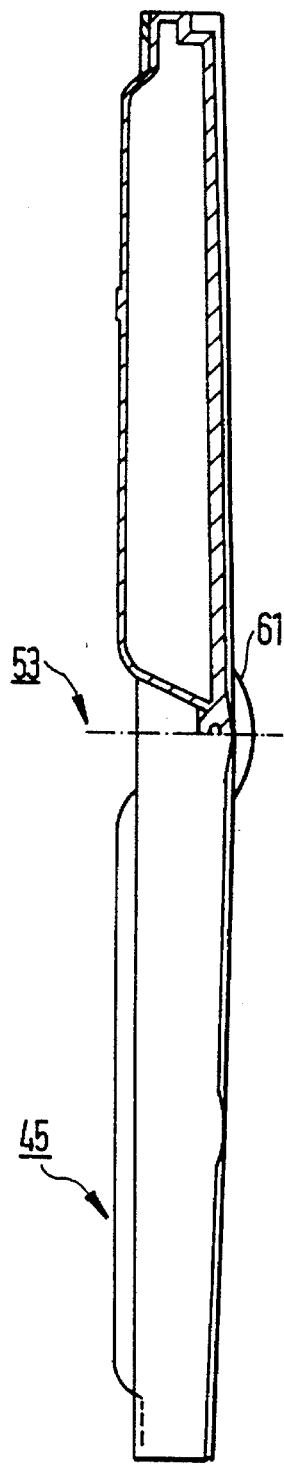
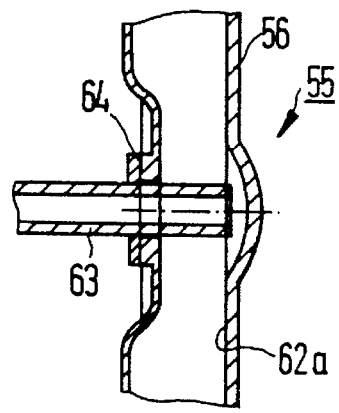

Detail "X"

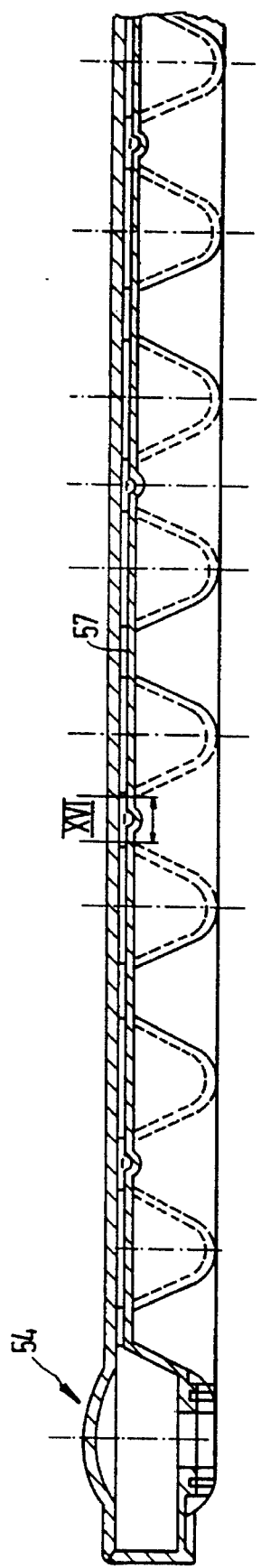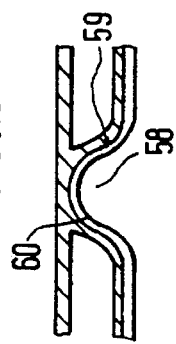

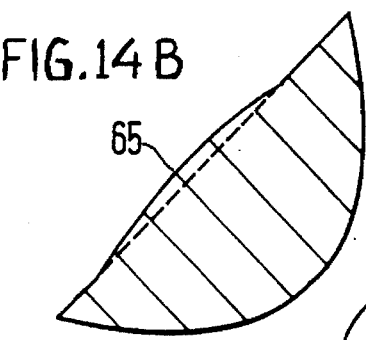
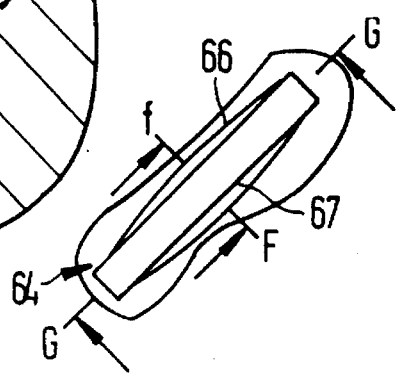
FIG. 14B    FIG. 14A    FIG. 14C
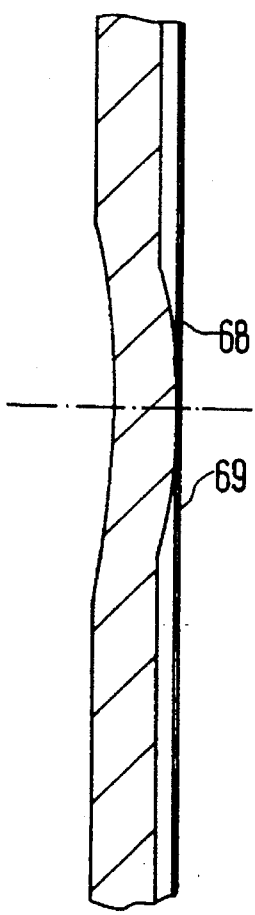
FIG. 15

PREFORMED HEATED FLOORING SYSTEM FOR STABLES AND OTHER ANIMAL SHELTERS

BACKGROUND OF THE INVENTION

The invention pertains to a preformed part for supporting surfaces for animals in a stable.

The invention refers especially to preformed parts of which intermediate floors in stables are assembled, where the preformed parts are laid onto rods of a grating and thereby a space is created between the tread surface of the floor and the stable floor, into which run liquid manure and other liquids, in order to assure a clean tread surface. Such preformed bodies are normally finished parts and consist of thermoplastic plastic. Due to their meshing with the grating rods, and with the aid of the horizontally meshing connections and the vertical mortise joints, they are held in place, secured against sliding in any direction.

Finished parts of this type are known (DE-PS 39 27 462). Their preformed body carries on opposing sides the dovetailing, the teeth of which are provided with recesses, so that the preformed parts can be pushed from above onto the profiles of the grating rods. The dovetail joints are, however, located in the opposite side of the preformed bodies which, as a rule, are of rectangular shape. The tread surface that has been made slideproof by a special profiling is a unit with downward extending preformed body edges and profiles which are supposed to increase the shape rigidity of the preformed part. The tread surface is interrupted by slot-like openings through which the liquid manure and other liquids run to the outside. However, the plate of the preformed body may through the described characteristics be penetrated by the slot-like openings without significant loss of strength.

In the practical application of such and other floors occurs a problem with sensitive animals, e.g., in pig farming, due to the low temperatures assumed by the stable floors, which increases especially in the cold season, especially if the floors consist, as described, of plastic. This is so, because the animals must be provided with adequately tempered surfaces to lie down on. Heated stable floors are already known, consisting of various materials. If those floors, in order to avoid costly electric resistant heating, are provided with a warm water heating arrangement, they consist of plates that contain built-in pipes through which the heating medium flows. Hence, stable floors of such finished parts are extraordinarily expensive and as a rule not suitable for normal livestock husbandry.

SUMMARY OF THE INVENTION

The present invention uses a different approach. According to the invention, the preformed part is enhanced to a hollow body that as a whole may also be manufactured of plastic, but effects the heating of the tread surface by having a heating device housed in the hollow space. A heat insulating layer is provided below the heating device to direct the heat upwards toward the surface. The new preformed part can, therefore, be manufactured as a finished part that together with known or exclusively with other like preformed parts is, according to the invention, assembled on a grating to form a floor covering with continuous tread surface that is secured against dislocation in horizontal and vertical directions. Relatively large floor areas can in this relatively simple way be adequately warmed.

The present invention is adaptable for use with electrical resistance heating. However, more widespread is generally the form of execution in which the heating arrangement is designed for a flowing heat medium. In principle, hot air is also suitable for this, although hot water heating is common. For such heating, a tube register is required, for which the invention suggests a simple version in which the tube register forms a unit within the preformed body.

One of these forms of execution is further defined, in which the register consists of a tube that heats the entire tread surface of the preformed body. Alternate embodiments have the advantage that they provide an adequate cross-section for the heating medium and simultaneously also increase substantially the shape rigidity of the entire structure.

One problem associated with using a liquid heating medium, i.e., normally with warm water, is the exit of gasses dissolved in the warm water, i.e., primarily of air. This air, if left in the warm water, affects the heat transfer negatively. Therefore, it needs to be removed from the warm water. While valves are provided for this purpose in the conventional warm water heating systems, the present invention avoids values that require the installation of movable parts, and such are also costly, by providing valveless air removal from the warm water used for the heating.

The present invention is provided with a middle channel that receives the gases dissolved in the water of the heating device. Air dissolved in the warm water, as a result of the difference in gravity between gas and liquid, flows upwards along upward-rising flanks in the partial lengths of the register tubes and reaches the middle channel through bypasses. Since only a side stream is formed in the middle channel, and main streams continue to pass through the register tubes, an optimal heat transfer occurs in the register and air is flowing away in the middle channel without requiring further provisions other than an adequate sizing of the register tubes or channel cross sections.

If one follows the path of the air bubbling from the warm water, it is seen that the inlets and outlets for the warm water on the register are also important. Two pipe stems are provided so that the flow direction of the warm water may be selected as needed, i.e., it is independent of the particular arrangement of the new preformed part in the intermediate floor. Domes are provided positioned over the mouths of these pipe stems to accept the air that bubbles out, including the air flowing off through the middle channel. The middle channel connects to the respective domes at a position lower than the pipe stems. By this method, the invention achieves an adequate deaeration of the warm water used for heating, while avoiding special components.

For a durable operationally safe floor made of such preformed parts, it is in many applications necessary to enclose the heating device and its insulation in such a manner that these structural elements cannot be soiled. It is also important to keep pests, and among these especially rodents, out of the hollow space in which these parts are located. Furthermore, it is appropriate to protect the structural elements of the new preformed part, housed in the hollow space, against moisture. This involves in stables not only the liquid components of liquid waste, but also the cleaning liquids required for the cleaning of the tread surface. The present invention has shape-defining measures, adding to the simplification of the preformed part and reliably accomplishes that the liquids running off the tread surface exit through the pan before they enter the hollow space and are able to cause damage therein.

The tread surface should on one hand be constructed such that it leads the described liquids away as fast as possible, but on the other hand prevents the sliding on the platform, which in the keeping of hoofed animals and with plastic surfaces is especially urgent. These, as such contradictory requirements, can be fulfilled by the present invention, since although the interruption of the ribs lead the liquids away over a short path, they do not impede the slip-prevention by the ribs. This applies also to the short ribs that may additionally be provided in some or all of the pockets.

If, in spite of all precautions, some of the liquid waste should anyhow reach the hollow space of the preformed part, it will initially collect on the bottom plate. The present invention lets these liquids flow to the center and exit through the openings provided there. As a result, the parts of the preformed part required for its functioning, housed in the hollow space, can also under unfavorable conditions be kept dry.

Although the pan floor can be flat, it may be used in several ways for the optimization of the preformed part. The pan floor of the present invention is divided by fibs. The ribs increase the form stability, and additional air spaces are created between the pan floor and the insulation elements which, among other things, add to the heat insulation. Since the heat insulation is most-important of the parts housed in the hollow space, it is appropriate to manufacture them out of standard materials. A heat insulating panel securely seated in the hollow space, serves for this. With that, alternative heating arrangements become possible, since the heating device can also be housed in such a panel as an electrical resistant heating. Curing materials may also be used for the heating arrangement and/or its insulation.

With other forms of execution which do not have flat pan bottoms, difficulties may occur in the packaging of several preformed parts for shipping to the application location, since they cannot be securely supported on each other without danger of slippage. This problem is solved in the present invention by providing for the slip-proof stacking of multiple preformed parts, which can then also be safely packaged.

BRIEF DESCRIPTION OF THE DRAWINGS

FIG. 6 is a partly drawn top view of an alternative embodiment of a preformed part according to the present invention.

FIG. 7 is a sectional view taken along line A—A of FIG. 6.

FIG. 8 is a sectional view taken along line B—B of FIG. 6.

FIG. 12 is a partial sectional view taken along line D—D of FIG.

FIG. 13 is a sectional view taken along line C—C of FIG. 6.

FIG. 14A is a detailed view of portion V from FIG. 6.

FIG. 14B is a sectional view taken along line G—G of FIG. 14A.

FIG. 14C is a sectional view taken along line F—F of FIG. 14A.

FIG. 15 is the detail shown at Z in FIG. 6,

FIG. 16 is a partial sectional view taken along line E—E of FIG. 6.

DETAILED DESCRIPTION OF THE PREFERRED EMBODIMENTS

Figure 1:
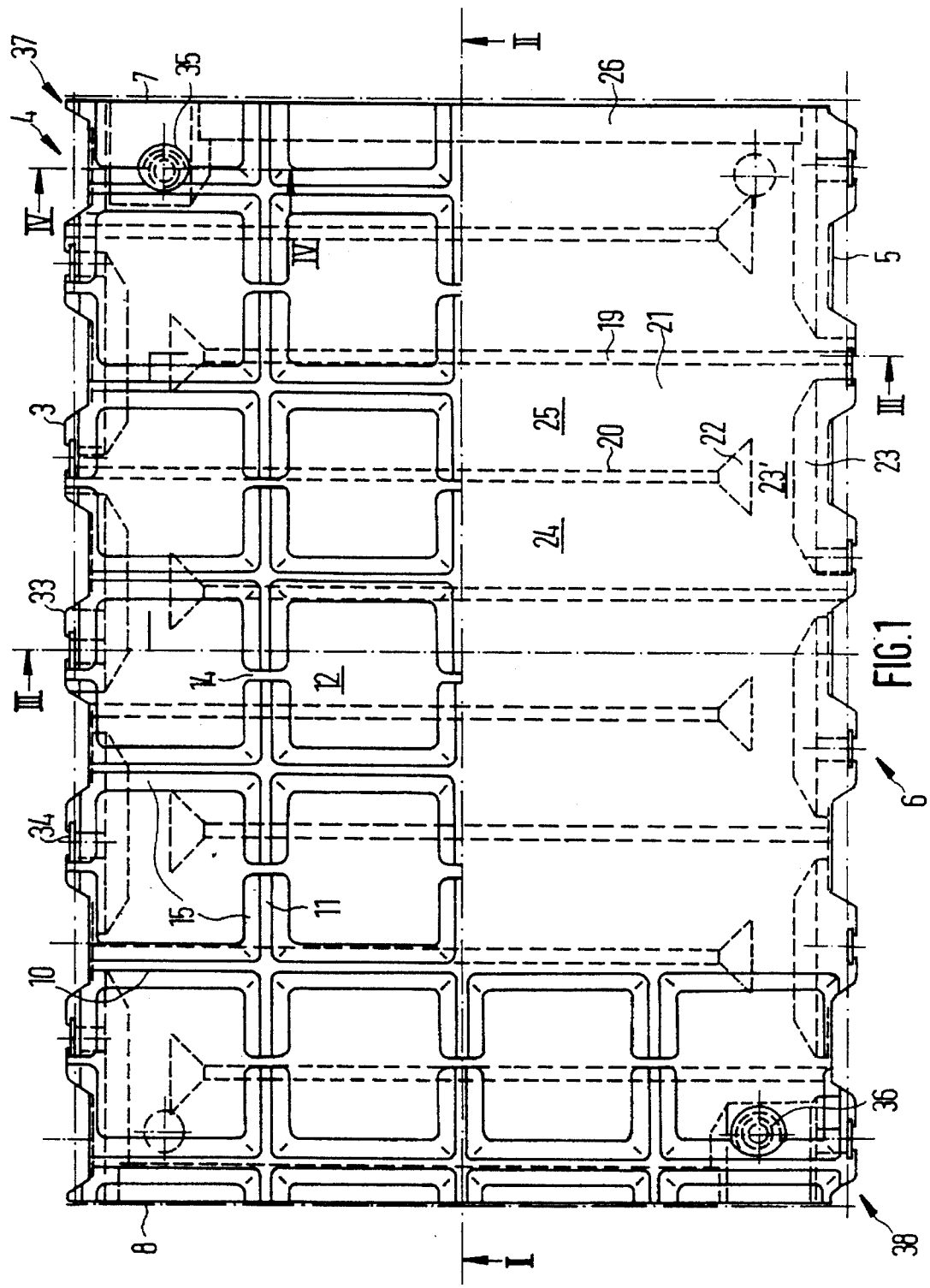
FIG. 1 is a partly drawn top view of a preformed part according to a first form of execution.
Figure 2:
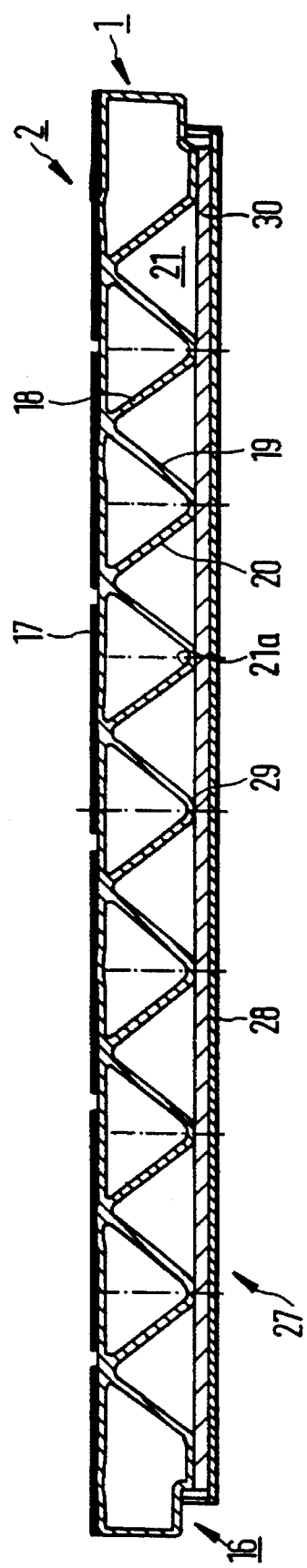
FIG. 2 is a sectional view taken along line II—II of FIG. 1.
Figure 3:
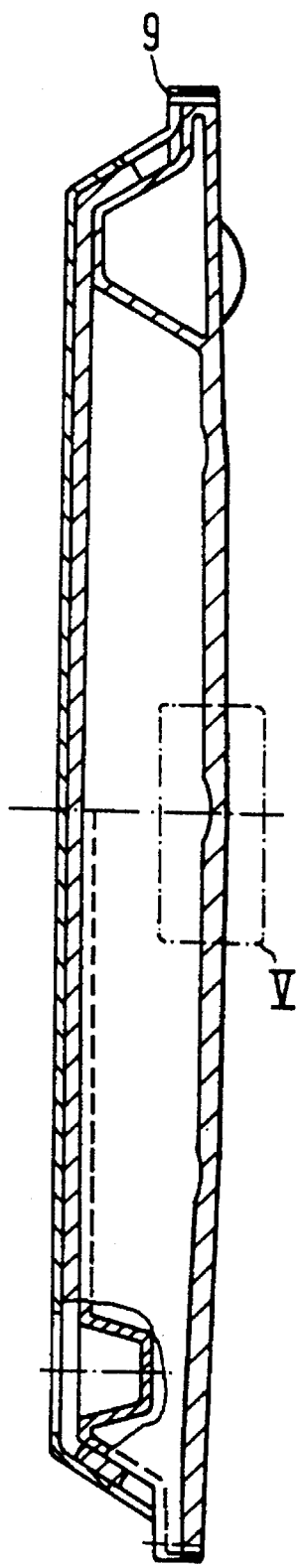
FIG. 3 is a sectional view taken along line III—III of FIG. 1.
Figure 4:
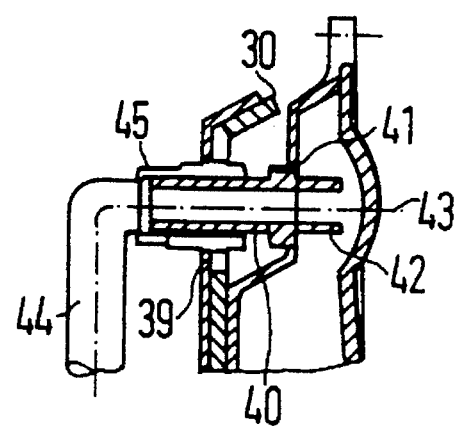
FIG. 4 is a detailed sectional view taken along line IV—IV in FIG. 1.
Figure 5:
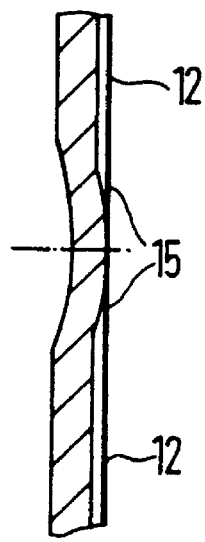
FIG. 5 is a detailed view of portion V from FIG. 3.

According to the form of execution depicted in FIG. 1 to 5, the preformed part labelled 1 is used for the segmental construction of floor coverings in livestock stables. It contains on its upper surface a tread surface 2 of an intermediate floor and has a generally rectangular plan view shape. The preformed part 1 has first and second longer rectangular sides 4 and 6, respectively, that have mating projections or teeth 3 thereon and first and second shorter rectangular sides 7 and 8, respectively. The projections ("teeth") 3 of the rectangular side 4 are located opposite corresponding recesses ("tooth-gaps") 5 of the rectangular side 6. This achieves alignment of the shorter rectangular sides 7, 8 of adjacent preformed parts 1 with interlocking projections. The projections ("teeth") 3 are provided on their underside with aligning slots 9 with which the preformed part I supports itself on its longitudinal edges on grating rods (not shown). The short rectangular sides 7, 8 are provided with recesses and pins (not shown). With contacting rectangular sides 7, 8, the pins are inserted into the recesses 5, whereby the parts are vertically and horizontally secured against slippage. This results in a continuous tread surface out of several preformed parts 1 on the intermediate floor supported above the grating.

The tread surface 2 is uniformly divided into pockets 12 by cross ribs 10 running parallel to the shorter rectangular sides 7 and 8, and by longitudinal (cross) ribs 11 located parallel to the longer rectangular sides 4 and 6. The pockets 12 are recessed relative to the ribs 10 and are connected with each other by openings 14 in the cross ribs 11. In this manner, a non-slip surface of the preformed part is created that prevents the sliding of the hoofs of the livestock. In this, each of the ribs is equipped with flanking sides 15 that slope downwards into the fields 12 and guide the hoofs into the fields 12.

According to the form of execution corresponding to FIG. 1 to 5, the tread surface 2 is formed on the upper surface of a heating register 16. A cover plate 17 is provided that combines with a register tube 18 of a warm water heating arrangement 21 to form one structural unit with the cover plate 17 forming on its outside the tread surface 2. The register tube wall is generally V-shaped and has sides 19 and 20 that converge to the downside and are formed as extensions of the cover plate 17, and are connected with a rounded ridge 21a.

According to the form of execution corresponding to FIG. 1 to 5, the heating arrangement 21 consists of a register tube that is composed of several partial lengths, each of which extends over the entire dimension of the tread surface 2 between the longer rectangular sides 4 and 6. Two adjacent partial lengths 24, 25 have a common middle wall 20 that is shortened in the horizontal and end at an arrow 22 of a triangular cross-section. Between the arrow 22 and preformed body wall 23 is thereby created a connecting channel 23' for the adjacent partial lengths 24, 25. These connections are alternatingly assigned to the opposing longer rectangular sides so that in total a meandering path of the circulating water results through the register of the heating arrangement 21. The shorter rectangular sides 7 and 8 contain end walls 26, running perpendicularly to the end walls 23, and close off the outer heating channels.

The underside of the heating arrangement 21 is covered by a pan 27. The pan includes as a unit 28, a flat bottom plate 29 and an insulation layer 30 supported by the flat bottomed plate. The insulation layer 30 consists of a mineral fiber mat that on its side facing the bottom plate 29 is provided with a heat-reflecting foil (not shown). The longer rectangular sides 4 and 6 of the pan 27 are provided with a device for locking the pan to the preformed body, which consists of hammer-shaped brackets 33 that snap into recesses 34 of the teeth 3.

The structural unit of the pan 27 is made like the preformed body of plastic but is a significantly lighter preformed body. The pan bottom plate 29 has essentially circularly restricted openings 35, 36 located in corners 37, 38 of the register, opposite to each other. These openings with essentially circular edges are used for inserting flanged pipe stems 40 that with their flange 41 ring the opening of an inner pipe stem 42. These inner openings are situated below a dome-shaped rise 43 of cover plate 17. The pipe sockets which are friction-welded to the pan, are used for feeding and removal of the warm water. For example, the warm water is fed through the opening 36, while it is discharged through the opening 35 after it has flown through the heating register in a meandering path.

A connecting hose 44, preferably consisting of plastic, having an end 45 is pulled over the pipe stem 40. A pipe fitting may also be used here. On completely installed floors, the connecting hoses are fastened such that a closed warm water circuit results. Since the dome-shaped rises 43 with their peripheries surround the inner pipe stems 42 relatively tightly, they can, also due their placement in the corners 37, 38 be arranged such that they do not disturb the tread surface 2, i.e., not constitute obstructions for the hoofs of the livestock.

Not depicted is the possibility to connect one preformed part as such, or several preformed parts I assembled to a partial area of the floor, to one or several conventional preformed parts that form one or several unheated residual areas of the floor consisting of unheated preformed bodies which are each horizontally linked at longer rectangular sides 4, 6 and at the shorter rectangular sides 7, 8. The parts are vertically linked by mortise-joints and also supported on the grating as a continuous floor covering. This requires, naturally, that the mating teeth joints and mortise joints of the preformed parts are compatible with each other. If this is not the case, groove-filling slats are used in the grooves of neighboring preformed parts that contain on their opposite vertical sides the parts needed for the mortise joints.

The form of execution depicted in FIGS. 6 to 24 is preferred, since it is optimized in several aspects compared with the form of execution according to FIG. 1 to 5. A preformed body 44 of this form of execution is depicted in FIGS. 6–16, while FIG. 17 to 23 depict the pan 27 that is through a detachable joint connected with the preformed body 44. The insulation layer 30 uses the mineral fiber mat housed between the pan 27 and the preformed body 44. After insertion of this mat, the preformed part 1 is supplied as a finished part through connection of the pan 27 with the preformed body 44. The preformed body 44 constitutes then a cover 45 of the previously mentioned hollow body 16.

Figure 9:
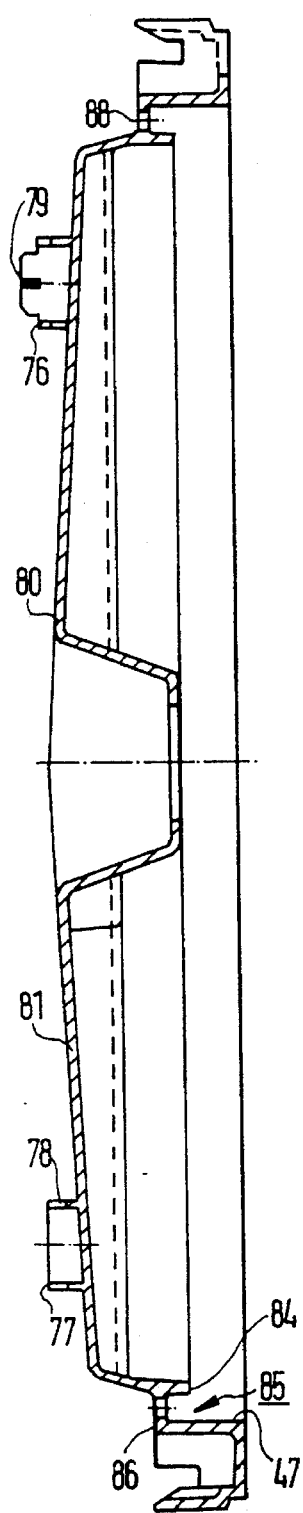
FIG. 9 is an alternative embodiment of FIG. 7.
Figure 18:
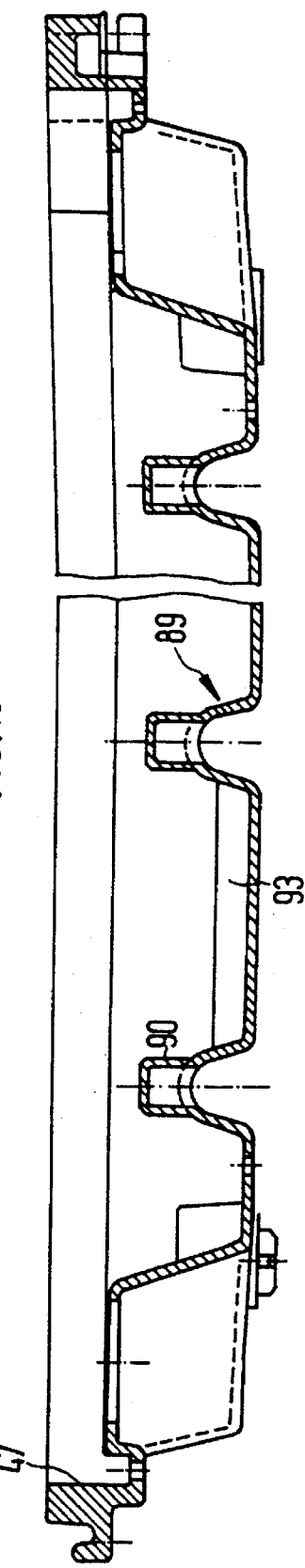
FIG. 18 is a sectional view taken along line C—C of FIG. 17.
Figure 19:
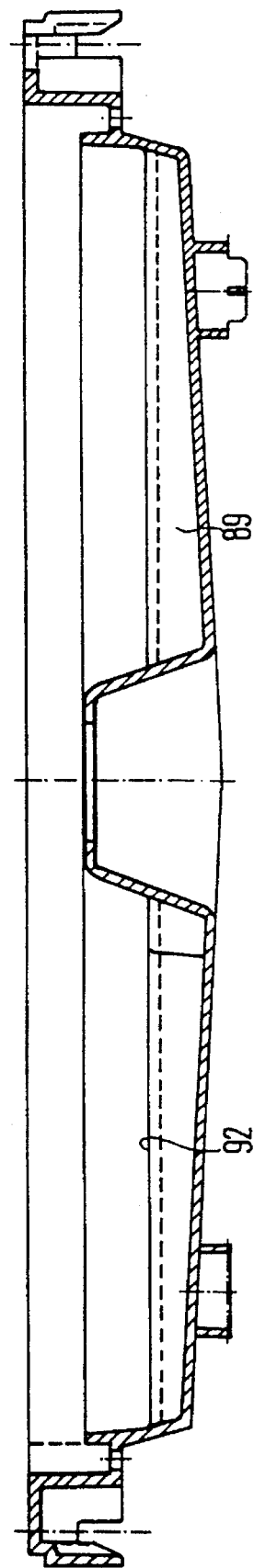
FIG. 19 is a sectional view taken along line B—B of FIG. 17.

A peripheral cover edge, for this form of execution is generally labelled 46 (FIG. 10), which fits between a pan edge 47 which projects upwards (FIG. 9 and 18). In its final position it is elastically held by wedge-shaped tabs 48 (FIG. 23) that project inside from the pan edge 47. On insertion of the cover, the tabs 48 at first move away to the outside and, in the final position of the cover fit into recesses 49 (FIG. 6). By reversing this procedure, the locked parts of this connection can be separated from each other.

In this form of execution, too, the heating is housed in a register 50 that, however, in contrast to the form of execution according to FIG. 1 to 5 contains two tubular channels 51, 52 (FIG. 10) arranged symmetrically to the center line 53. These channels direct the heating medium, which is hot water, also in a meandering path underneath the tread surface 2 of preformed body 44 in order to warm them, where in each of the tubes 51, 52, a main stream of the heating medium results. Warm water feed and discharge lines 54 and 55 are arranged in the center 53 (FIG. 6 and 7 to 12) of the long dimension that is the symmetry plane, and are of identical shape (FIG. 12). The partial lengths which are also in these tubular channel contained start outside from a preformed body edge and extend to the center 53 of the preformed body 44. There, like the tube channels, a middle channel 57 that follows the center line 53 is also formed downward out of a cover plate 56 and into the hollow space of the pan. At the reversing points of the meander are bypasses 58, through which a partial flow from the tube channels is fed.

Figure 10:
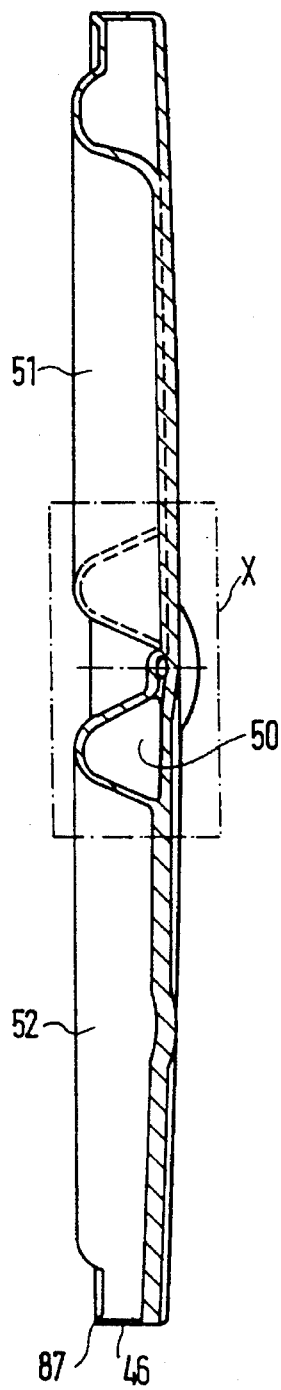
FIG. 10 is an alternative embodiment of FIG. 8.
Figure 11:
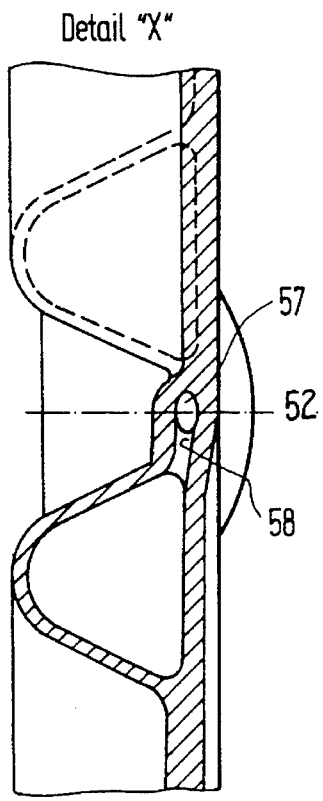
FIG. 11 is a detailed view of portion X from FIG. 10.

FIG. 7 shows that the tread surface 2 of the cover plate 56 contains flanks 59, 60 rising towards the center line 53. Consequently, the highest point of the tube channels are always located at the center line 53, with the result that the air bubbling from the warm water of the main streams reaches the middle channel 57 as shown in the broken-off depiction of FIG. 13 as a longitudinal section. The individual depiction of FIG. 16 shows that the bypasses 58 are sloping upwards in the same direction as the flanks 59, 60 towards the middle channel 57. The flow cross section of this channel is, as can especially be seen in comparison with FIG. 11, considerably smaller than the respective flow cross section of the tube channels 51 and 52, resulting in a relatively small side stream in the middle channel 57. In contrast, considerably larger volume streams, constituting the major portion of the heating medium, flow in the tube channels 51, 52 (FIG. 10).

It can be seen in FIG. 7, 8 and 12 that the middle channel 57 ends under a dome, either 61 or 62, and that a pipe stem 63, depicted in FIG. 12 for the dome 62, which can be used with the respective pipe stem of dome 61 as inlet or outlet for the heating medium, ends with its mouth above the underside of plate 56, so that the mouth lies higher than the tube channels 51, 52, but also higher than the mouths of the middle channel 57 in the dome. Flange 64 of the pipe stem 63 is friction-welded. It can also be seen from FIG. 7 and 8 that both domes 61 and 62 are aligned on the center line 53.

The cover plate 56 is like the form of execution according to FIG. 1 to 5 subdivided into pockets 12, which are depicted and described in connection with FIG. 1. However, in some of the pockets 12, short ribs 64 are arranged in rows in which the short ribs are inclined by approximately 45° against a center line 65 of the pockets 12, where in sequential lines, these inclinations are running in opposite directions. This assures that the liquids can run off between the short ribs but that a sliding-off of the animals is counteracted in all horizontal directions. As shown in FIGS. 14A–14C, these short ribs have a curved surface 65 and flanks 66, 67 running out at the rib ends, whereby sharp edges are avoided, but an adequate form stiffness is obtained. FIG. 15 shows the slope of flanks 68, 69 of the pockets that, as described in the beginning, let the hoofs slide towards the center of the pocket.

Figure 17:
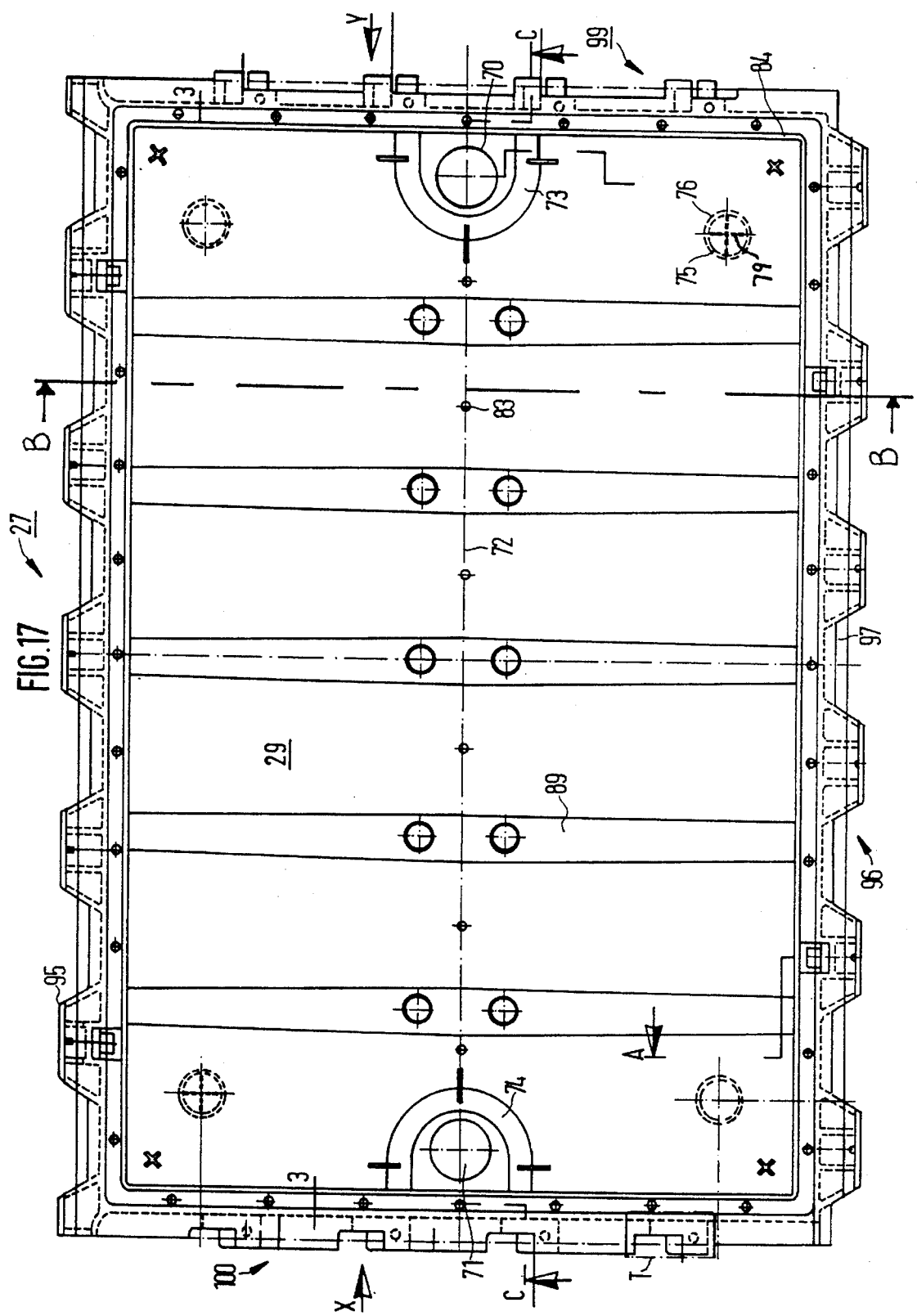
FIG. 17 is a top view of a bottom pan according to the present invention.

Bottom plate 29 is shown with its details in FIG. 17. Openings 70, 71 for the pipe sockets 51, 52 are aligned recessed in sleeves 73, 74 in the shape of a truncated cone along the longitudinal center 72 of the bottom plate 29. The four corners of the rectangular bottom plate 29 are provided on the underside with sleeves 75, that have head rims 77 to support themselves on sleeves 78 belonging to an adjacent preformed part 1 in a stack. Hollow cross members 79 extend from the edges 76 and can be inserted in sleeves 78 (FIG. 9) for the creation of a shape closure with the inside cylinder of the sleeves 78 in the assembly of a stack of preformed parts.

The center line 72 of the bottom plate slopes downward with two bottom flanks 80 and 81 according to the form of execution shown in FIG. 9, but does not interfere with the stacking of the preformed part. This slope of the two bottom flanks 80, 81 directs liquids on the bottom toward the center. Aligned with the longitudinal center are holes 83 (FIG. 17). The drained-off liquids are discharged through these holes to the outside. As an aid to keep the surrounding area dry, a peripheral ledge 84 is also provided that forms the inner wall of a gutter 85, the bottom of which is located underneath a drip spout 87 that is molded on the lengthwise edges of the preformed body as shown at 46 in FIG. 10. The gutter bottom 86 has interspaced holes 88 in it, through which the liquids collected in gutter 85 can run off.

FIG. 17 shows further in connection with FIG. 18 that the bottom plate 29 of the pan is divided by several ribs 89 projecting into the pan space. These ribs are equally spaced and carry on their back nubs 90 that on insertion of a heat-insulating mat 30, seal off the pan bottom, since the heat-insulating mat 30 is provided with fitting holes into which the nubs insert as soon as the mat is lying on the back 92 of the ribs 89. This creates additional insulating air space as indicated at 93 in FIG. 18.

Figure 23:
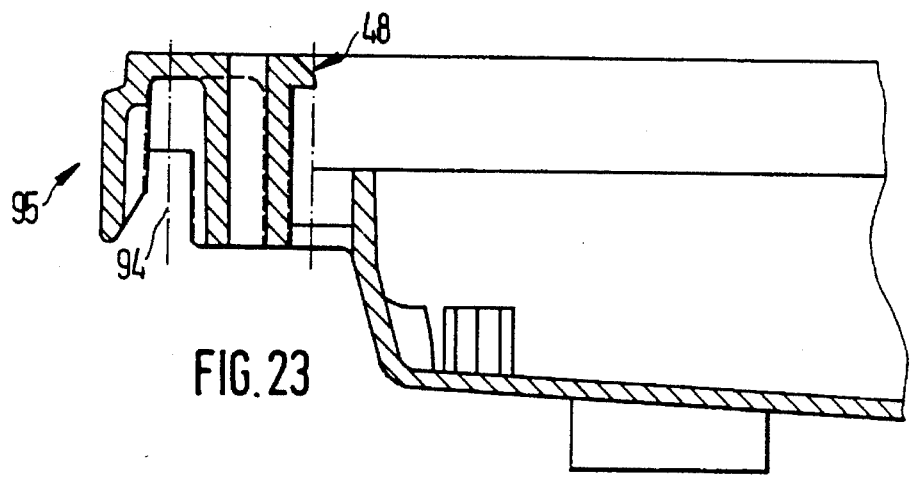
FIG. 23 is a partial sectional view taken along line A—A of FIG. 17.
Figure 20:
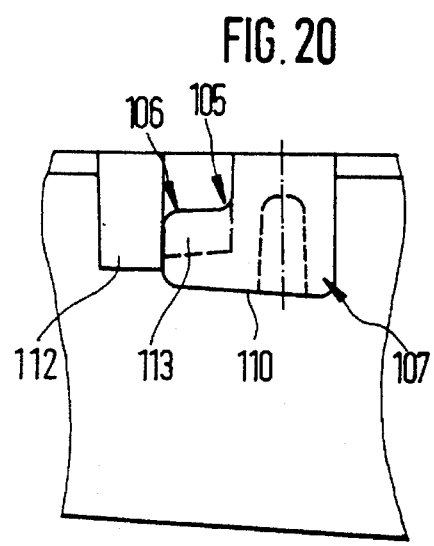
FIG. 20 is a detailed view at X in FIG. 17.
Figure 21:
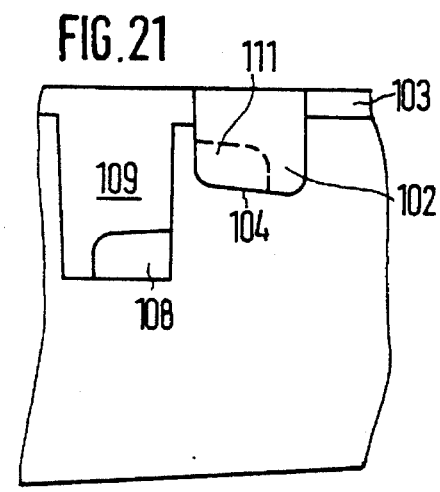
FIG. 21 is a detailed view at Y in FIG. 17.
Figure 22:
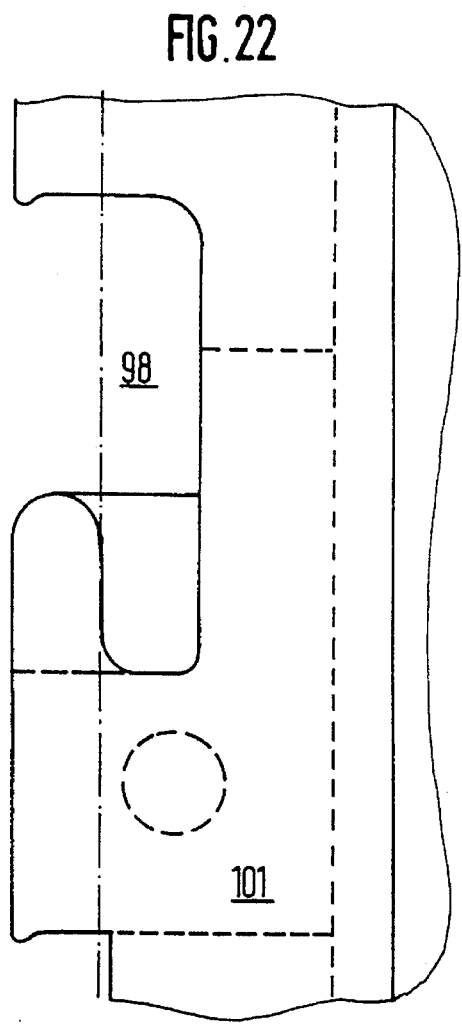
FIG. 22 is a detailed view at T in FIG. 17.

The above described, finished preformed part 1 can be laid onto grating rods (not shown) and interlocked with the grating rods in the horizontal plain. Therefore, the preformed part cannot be moved transverse to the grating rods. This is assured by recesses 94 on the underside of teeth 95 of a joint 96, that is molded into the opposite pan edges (FIG. 17 and 23). The teeth 95 fit herein horizontally into tooth gaps 97. In the perpendicular direction to this, an interlock is achieved by recesses 98 in the pan edges 99, 100 (FIG. 17 and 20 to 22). These recesses are located in the horizontal flanges of these pan edges. Tabs 102 of the flange 103 of the peripheral pan edge 100 are provided to fit into the recesses 98 (FIG. 21). They are supported on their underside 104 on a hammerhead surface that is formed in the pan edge 99 between two arrows 105 and 106 of a support tab 107.

Next to the tabs 102, bearings 109 are provided that align with the outer edge of the pan flange 103 and from which supports 108 extend to the outside to support the underside 110 of the support tabs 107, where the tabs 102, due to undercuts 111 are fitted to projections 112 on the opposite pan edge. The support tabs 107 also have an undercut 113 of their hammerhead in which the tabs 102 insert. The result is that in this way the neighboring flanges are supported in all horizontal directions, so that the preformed body 1 built in a floor area cannot dislocate and its flanges cannot be deformed by the weight of the animals.

Although the present invention has been described with reference to preferred embodiments, workers skilled in the art will recognize that changes may be made in form and detail without departing from the spirit and scope of the invention.

I claim:

1. An intermediate floor preformed part for the segmental construction of a floor covering, the preformed part comprising:

a plate-shaped preformed body having a tread surface on an upper side thereof, the preformed body having mating teeth including recesses and projections on a side thereof for connecting to other preformed bodies to form the floor covering;

a bottom plate connected to the preformed body forming a hollow body therebetween;

a plurality of tube walls formed on the underside of the preformed body projecting into the hollow body forming a heating device having a plurality of tubular registers for holding a flowing medium therein; and an insulating material mounted between the heating device and the bottom plate for insulating the heating device.

2. The preformed part of claim 1 wherein the flowing heating medium is water.

3. The preformed part of claim 1 further comprising the plurality of tube walls being arranged side by side substantially parallel in a common plane and being continuous over the dimension of the tread surface, wherein the plurality of tube walls comprise a first and second plurality of tube walls and wherein the preformed body has first and second sides, the first plurality of tube walls being connected to the first side of the preformed body extending towards the second side of the preformed body, the first plurality of tube walls ending a distance from the second side of the preformed body, the second plurality of tube walls being connected to the second side of the preformed body extending towards the first side of the preformed body, the second plurality of tube walls ending a distance from the first side of the preformed body wherein the first and second plurality of tube walls are arranged such that they alternate.

4. The preformed part of claim 3 wherein the plurality of tube walls are essentially V-shaped with downward converging flanks.

5. The preformed part of claim 1 further comprising at least two tube channels in the tube walls having common feed and discharge of the heating medium, wherein the plurality of tube walls end at one of two parallel preformed body edges, and wherein a middle channel is provided parallel to the center line of the preformed body and connected to the at least two tube channels by a bypass wherein the middle channel handles the collection of gas from the heating medium.

6. The preformed part of claim 5 wherein there are two tube channels.

7. The preformed part of claim 5 further comprising a plurality of flanks on the bottom plate rising toward the center line, and wherein the middle channel is formed such that a side stream of the heating medium forms in it while mainstreams of heating medium are formed in the at least two tube channels.

8. The preformed part of claim 1 further comprising an inlet opening in the bottom plate for receiving a heating medium feed pipe stem therethrough and an outlet opening for receiving a heating medium discharge pipe stem therethrough, and wherein a dome is positioned above each of the pipe stems for collection of gas from the heating medium.

9. The preformed part of claim 1 further comprising a plurality of recesses in the bottom plate for receiving a plurality of heating medium feed and discharge pipe stems therethrough, and wherein a dome is provided above each of the pipe stems for collection of gas from the heating medium and wherein the pipe stems are located higher than the middle channels in the domes.

10. The preformed part of claim 1 further comprising a pan wherein the bottom plate forms a bottom wall of the pan, wherein the preformed body is insertable into the pan, and wherein the preformed body is locked into to the pan upon insertion therein by a locking means comprising several projections and recesses wherein the projections snap elastically in and out of the recesses.

11. The preformed part of claim 10 further comprising a peripheral drip molding positioned along the edges of the preformed body for diverting liquids away from the tread surface, and wherein the pan further comprises a gutter with drain holes for diverting liquids away from the pan.

12. The preformed part as in claim 1 further comprising a plurality of projecting ribs that separates the tread surface into a plurality of pockets wherein a plurality of run off paths for liquids are formed by interruptions of the ribs and wherein at least one of the plurality of pockets is provided with additional projecting ribs arranged in rows with opposite inclinations.

13. The preformed part as in claim 1 further comprising inclined flanks on the bottom plate that slope down towards a center line wherein a number of openings are provided in the bottom plate along the center line for the removal of liquids running down the flanks.

14. The preformed part of claim 13 further comprising a plurality of ribs separating the flanks which project into the hollow body for stiffening the bottom plate, and wherein the insulating material comprises an insulation mat is provided along the bottom plate and above the ribs and wherein a plurality of air spaces are created by the plurality of ribs to form an insulation barrier.

15. The preformed part of claim 14 further comprising nubs formed on the plurality of ribs wherein the insulation mat has recesses for receiving the nubs of the ribs therethrough.

16. The preformed part of claim 1 further comprising a plurality of sleeves on the bottom plate which extend below the bottom plate at the center line thereof, the sleeves forming supportive surfaces when preformed parts are stacked.

17. An intermediate floor composed of a plurality of intermediate preformed parts, each preformed part comprising:
 a plate-shaped preformed body having a tread surface on an upper side thereof, the preformed body having mating teeth including recesses and projections on a side thereof for connecting to other preformed bodies to form the floor covering;
 a bottom plate connected to the preformed body forming a hollow body therebetween;
 a plurality of tube walls formed on the underside of the preformed body projecting into the hollow body forming a heating device having a plurality of tubular registers for holding a flowing medium therein; and
 an insulating material mounted between the heating device and the bottom plate for insulating the heating device.

\* \* \* \* \*

UNITED STATES PATENT AND TRADEMARK OFFICE
CERTIFICATE OF CORRECTION

PATENT NO. : 5,456,209
DATED : October 10, 1995
INVENTOR(S) : MICHEL HEINRICH

It is certified that error appears in the above-indentified patent and that said Letters Patent is hereby corrected as shown below:

Col. 3, line 20, delete "fibs", insert --ribs.--

Col. 3, line 65, insert --6--, after FIG.

Col. 4, line 40, delete "I", insert --1--

Col. 5, line 56, delete "I", insert --1--

Signed and Sealed this

Sixteenth Day of January, 1996

Attest:

BRUCE LEHMAN

Attesting Officer

Commissioner of Patents and Trademarks